United States Patent [19]

Krumwiede et al.

[11] Patent Number: 5,565,388
[45] Date of Patent: Oct. 15, 1996

[54] BRONZE GLASS COMPOSITION

[75] Inventors: John F. Krumwiede, Cheswick; Larry J. Shelestak, Bairdford; Anthony V. Longobardo, Butler, all of Pa.

[73] Assignee: PPG Industries, Inc., Pittsburgh, Pa.

[21] Appl. No.: 415,792

[22] Filed: Apr. 3, 1995

Related U.S. Application Data

[63] Continuation-in-part of Ser. No. 153,399, Nov. 16, 1993, abandoned.

[51] Int. Cl.⁶ .................................................. C03C 3/087
[52] U.S. Cl. .................................................. 501/70; 501/71
[58] Field of Search .................................. 501/70, 71

[56] References Cited

U.S. PATENT DOCUMENTS

| | | | |
|---|---|---|---|
| Re. 25,312 | 1/1963 | Duncan et al. | 501/71 |
| 1,957,279 | 5/1934 | Linke | 501/71 |
| 2,524,719 | 10/1950 | Tillyer | 501/70 |
| 2,688,565 | 9/1954 | Raymond | 501/71 |
| 2,860,059 | 11/1958 | Molter et al. | 501/64 |
| 2,892,726 | 6/1959 | Smith et al. | 501/57 |
| 3,294,556 | 12/1966 | Harrington | 501/71 |
| 3,294,561 | 12/1966 | Duncan et al. | 501/71 |
| 3,296,004 | 1/1967 | Duncan | 501/71 |
| 3,300,323 | 1/1967 | Plumat et al. | 501/70 |
| 3,411,934 | 11/1968 | Englehart et al. | 427/168 |
| 3,498,806 | 3/1970 | Hammer et al. | 501/71 |
| 3,628,932 | 12/1971 | Inoue et al. | 65/18 |
| 3,660,061 | 5/1972 | Donley et al. | 65/32 |
| 3,723,142 | 3/1973 | Kato et al. | 501/71 |
| 3,967,040 | 6/1976 | Plumat et al. | 428/410 |
| 4,101,705 | 7/1978 | Fischer et al. | 428/220 |
| 4,104,076 | 8/1978 | Pons | 501/68 |
| 4,129,434 | 12/1978 | Plumat et al. | 65/60.52 |
| 4,190,452 | 2/1980 | Fischer et al. | 501/66 |
| 4,294,881 | 10/1981 | Meyer et al. | 428/334 |
| 4,308,319 | 12/1981 | Michelotti et al. | 428/432 |
| 4,336,303 | 6/1982 | Rittler | 428/334 |

(List continued on next page.)

FOREIGN PATENT DOCUMENTS

| | | |
|---|---|---|
| 596334 | 4/1990 | Australia . |
| 735187 | 5/1966 | Canada . |
| 0297404 | 1/1989 | European Pat. Off. . |
| 0452207 | 4/1991 | European Pat. Off. . |
| 0536049 | 4/1993 | European Pat. Off. . |
| 561337 | 8/1993 | European Pat. Off. . |
| 0619274 | 10/1994 | European Pat. Off. . |
| 2082647 | 11/1971 | France . |
| 2270215 | 4/1975 | France . |
| 2331527 | 11/1975 | France . |
| 2672587 | 4/1993 | France . |
| 2682372 | 4/1993 | France . |
| 2690437 | 10/1993 | France . |
| 1331492 | 9/1973 | United Kingdom . |
| 2162835 | 2/1986 | United Kingdom . |
| 91/07356 | 5/1991 | WIPO . |
| 91/11402 | 8/1991 | WIPO . |

OTHER PUBLICATIONS

"Glass Colors, V, Examples of the Composition of Colored Glasses", Kocik et al., Fachberichte, Sprechsaal, vol. 121, No. 1, 1988, 42–44 (No Month).

Patent Abstracts of Japan, vol. 6, No. 197, 6 Oct. 1982, JP–57 106 537.

(List continued on next page.)

*Primary Examiner*—Karl Group
*Assistant Examiner*—David Sample
*Attorney, Agent, or Firm*—Andrew C. Siminerio

[57] ABSTRACT

The present invention provides a glass composition having a bronze color and a luminous (visible) transmittance of 70% or greater. The base glass is a soda-lime-silica composition and iron and selenium are added as colorants. In one particular embodiment of the invention, a bronze colored glass with a luminous transmittance (C.I.E. illuminant A) of 70% and higher at a thickness of 4.1 millimeters may be attained by using as colorants: 0.4 to 0.6 wt. % $Fe_2O_3$, 0.09 to 0.17 wt. % FeO and 3 to 11 PPM Se. In addition, it is preferred that the total solar energy transmittance be no greater than 60%.

19 Claims, 1 Drawing Sheet

U.S. PATENT DOCUMENTS

| | | | |
|---|---|---|---|
| 4,339,541 | 7/1982 | Dela Ruye | 501/71 |
| 4,521,454 | 6/1985 | Kandachi et al. | 427/168 |
| 4,617,206 | 10/1986 | Haisma et al. | 427/374.1 |
| 4,719,126 | 1/1988 | Henery | 427/165 |
| 4,719,127 | 1/1988 | Greenberg | 427/165 |
| 4,728,353 | 3/1988 | Thomas et al. | 65/60.1 |
| 4,792,536 | 12/1988 | Pecoraro et al. | 501/70 |
| 4,798,616 | 1/1989 | Knavish et al. | 65/135 |
| 4,866,010 | 9/1989 | Boulos et al. | 501/71 |
| 4,873,206 | 10/1989 | Jones | 501/71 |
| 4,971,843 | 11/1990 | Michelotti et al. | 428/34 |
| 5,023,210 | 6/1991 | Krumwiede et al. | 501/71 |
| 5,030,593 | 7/1991 | Heithoff | 501/72 |
| 5,070,048 | 12/1991 | Boulos et al. | 501/71 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,318,931 | 6/1994 | Nakaguchi et al. | 501/64 |
| 5,380,685 | 1/1995 | Morimoto et al. | 501/71 |

OTHER PUBLICATIONS

S. A. Glaverbel, "The Behavior of Selenium and Its Compounds During the Melting of a Vitrifiable Batch" Sep. 1967.

"Iron–selenium black glass", A. Paul, Department of Glass Technology, University of Sheffield (No Date).

"Oxidation–Reduction Equilibria In Glass Between Iron and Selenium in Several Furnace Atmospheres", Frank Day, Jr. and Alexander Silverman, Journal of The American Ceramic Society, vol. 25, No. 13, pp. 371–381 1942 (No Month).

"Mechanism of selenium pink colouration in glass", A. Paul, Journal of Materials Science, pp. 415–421 1975 (No Month).

"Selenium in Oxide Glasses, Methods for Increased Retention", W. C. LaCourse, M. Otteneyck and B. Ukwu, American Glass Review, Nov. 1980.

*Ceramic Abstracts*, entitled "Intermediate Reactions during Fusing of Selenium and some of its Compounds in a Soda–Lime–Silicate Glass Frit", vol. 14, No. 10, p. 244 1938 (No Month).

*Ceramic Abstracts*, entitled "Manufacture of Selenium Rose and Selenium Ruby", vol. 18, No. 6, p. 152 1938 (No Month).

"Selenium Dioxide as a Constituent of Glasses", L. Navias and J. Gallup, pp. 441–449. (No Date).

"Behavior of Selenium in Glass", The Glass Industry, Jul. 1934, pp. 122–125.

BRONZE GLASS COMPOSITION

CROSS REFERENCE TO RELATED APPLICATIONS

This application is a Continuation-in-Part of U.S. patent application Ser. No. 08/153,399 filed on Nov. 16, 1993 now abandoned.

BACKGROUND OF THE INVENTION

This invention involves a bronze colored glass that has a luminous transmittance that makes it highly desirable for use in forward vision areas of a vehicle, such as a windshield and front door windows. In particular, the glass has a luminous transmittance of 70% or greater. In addition, the glass of the present invention generally exhibits infrared and total solar energy transmittance comparable to typical green glasses used in automotive applications to reduce heat gain in the interior of the enclosure. The glass is also compatible with flat glass manufacturing methods.

Various heat-absorbing glass substrates are known in the art. The primary colorant in typical green tinted automotive glasses is iron, which is usually present in both the $Fe_2O_3$ and FeO forms. As is conventional, the total amount of iron present in a glass is expressed herein as $Fe_2O_3$, regardless of the form actually present. Typical green tinted automotive glass has about 0.5 percent by weight total iron with the ratio of FeO to total iron being about 0.25.

Some glasses include nickel oxide as a colorant to provide a yellow brown to green brown color component to the glass. For example, U.S. Re. Pat. No. 25,312 to Duncan et al. includes nickel oxide as a colorant to produce a gray colored glass. However, inclusion of nickel containing materials must be carefully controlled because the presence of nickel during the melting process sometimes leads to the formation of nickel sulfide stones in the glass. Additional potential problems faced when using nickel include haze formation on the glass surface due to reduction of the nickel in the tin bath and change in the glass color when it is heat treated.

To avoid this problem, nickel-free bronze and gray glasses containing iron oxide, cobalt oxide, and selenium were developed as disclosed in U.S. Pat. No. 3,296,004 to Duncan et al.; U.S. Pat. No. 3,723,142 to Kato et al. and British Patent Specification 1,331,492 to Bamford. In U.S. Pat. No. 4,104,076 to Pons, instead of nickel, $Cr_2O_3$ or $UO_2$ are used in combination with iron oxide, cobalt oxide, and selenium to produce gray glass. A more recent nickel-free version of gray glass is disclosed in U.S. Pat. No. 5,023,210 to Krumwiede et al. which uses iron oxide, cobalt oxide, selenium, and chromic oxide as colorants.

Many of the commercially available bronze and gray glasses exhibit solar performance properties inferior to those of conventional green automotive glass. It would be desirable to have a bronze glass that may be used for the vision area of a vehicle with acceptable solar performance properties and further that is compatible with commercial flat glass manufacturing techniques.

SUMMARY OF THE INVENTION

The present invention provides a glass composition having a bronze color and a luminous (visible) transmittance of 70% or greater. The glass of the present invention has a standard soda-lime-silica flat glass base composition. In a preferred embodiment of the invention, a bronze colored glass with a luminous transmittance of 70% and higher at a thickness of 4.1 millimeters (0.160 inches) is produced using as colorants: 0.4 to 0.6 wt. % $Fe_2O_3$, 0.09 to 0.17 wt. % FeO and 3 to 11 PPM Se.

In an alternate embodiment of the invention, the bronze glass composition may also include chromium, nickel and/or cobalt as additional colorants.

The dominant wavelength of the glasses in the present invention may vary somewhat in accordance with particular color preferences. In the present invention, it is preferred that the glass be a bronze color characterized by dominant wavelengths in the range of 540 to 575 nanometers (nm), with an excitation purity of up 9%.

DETAILED DESCRIPTION

Figure 1:
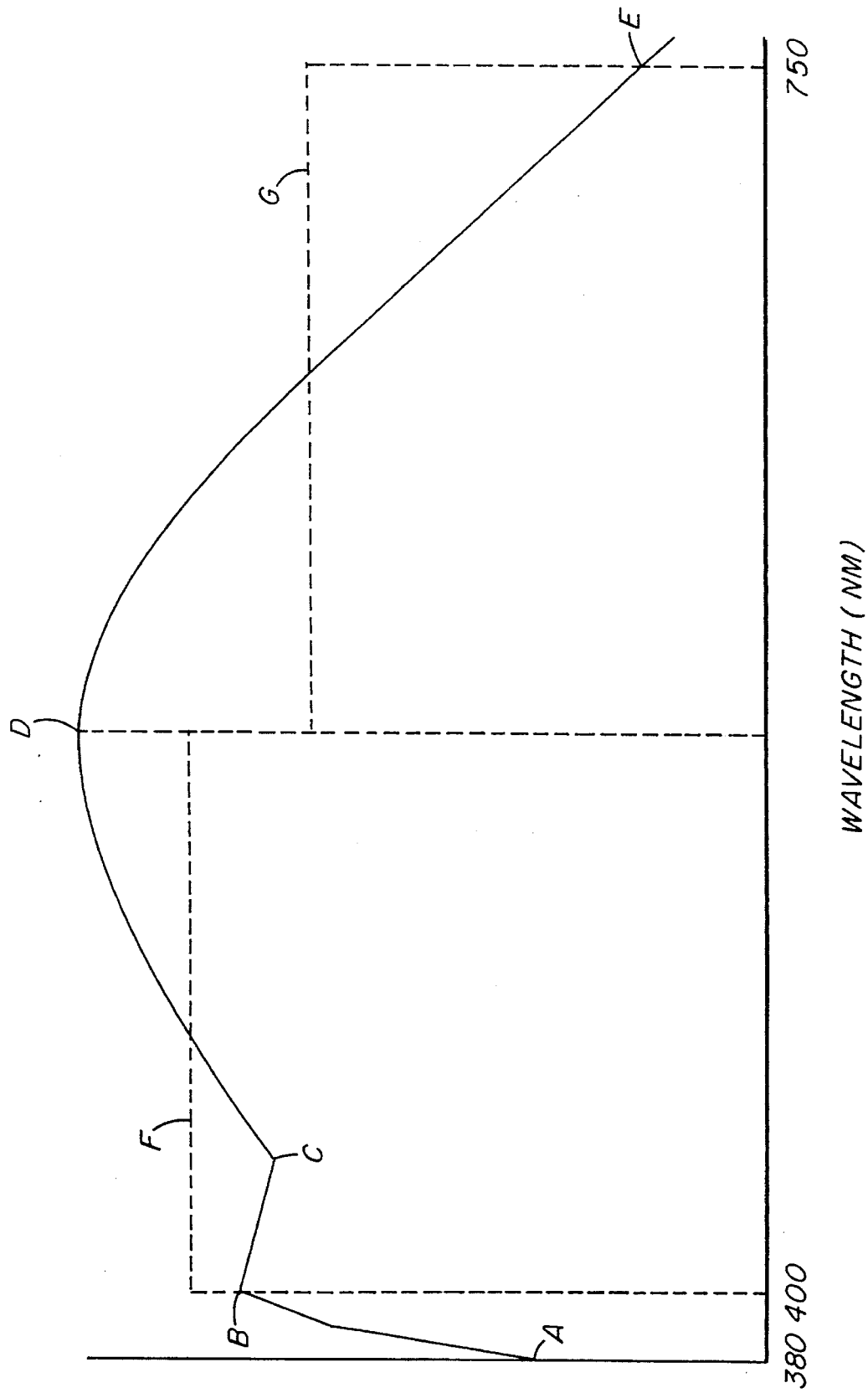
FIG. 1 is a graph illustrating the typical shape of the transmittance curve within the visible spectrum for glass made according to the present invention.

The base glass of the present invention, that is, the major constituents of the glass without colorants, is commercial soda-lime-silica glass characterized as follows:

|       | Weight % |
|-------|----------|
| $SiO_2$ | 66–75 |
| $Na_2O$ | 10–20 |
| CaO | 5–15 |
| MgO | 0–5 |
| $Al_2O_3$ | 0–5 |
| $K_2O$ | 0–5 |
| BaO | 0–1 |

To this base glass, the preferred embodiment of the present invention adds colorants in the form of iron and selenium. The glass of this embodiment of the present invention is essentially nickel-free, that is, no deliberate addition of nickel or nickel compounds is made, although the possibility of traces of nickel due to contamination may not always be avoided and further is essentially free of other colorants. It should be appreciated that the glass compositions disclosed herein may include small amounts of other materials, for example, melting and refining aids, tramp materials or impurities. Such materials may include, but are not limited to chromium, cobalt, manganese, cerium, molybdenum, titanium, chlorine, zinc, zirconium, sulfur, fluorine, lithium and strontium. It should be further appreciated that some of these materials as well as others may be added to the glass to improve the solar performance of the glass as will be discussed later in more detail. In another embodiment of the invention, nickel, chromium and/or cobalt may also be added to the glass composition to provide the desired spectral and performance requirements.

The selenium colorant contributes a pink color to the glass as well as a brown color when complexed with iron to form iron selenide (FeSe). Iron contributes yellow and blue in varying proportions depending upon the oxidation state.

The glass of the present invention may be melted and refined in a continuous, large-scale, commercial melting operation and formed into flat glass sheets of varying thicknesses by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least 0.05 wt. % in the first few microns below the surface of the glass that was in contact with the tin.

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). Unless stated otherwise, the term $Fe_2O_3$ in this specification shall mean total iron expressed in terms of $Fe_2O_3$ and the term FeO shall mean iron in the ferrous state expressed in terms of FeO.

The glass compositions disclosed in the present invention may be made using any of several types of melting arrangements, such as but not limited to, a conventional, overhead fired continuous melting operation as is well known in the art or a multi-stage melting operation, of the type that is discussed later in more detail. However, for glass compositions having a redox of less than 0.30, the former operation is preferred and for glass compositions having a redox of 0.30 or greater, the latter operation is preferred.

Conventional, overhead fired continuous melting operations are characterized by depositing batch material onto a pool of molten glass maintained within a tank type melting furnace and applying thermal energy until the materials are melted into the pool of molten glass. The melting tanks conventionally contain a large volume of molten glass so as to provide sufficient residence time for currents in the molten glass to affect some degree of homogenization and fining before the glass is discharged into a forming operation.

The multi-stage glass melting and refining operation disclosed in U.S. Pat. Nos. 4,381,934 to Kunkle et al.; 4,792,536 to Pecoraro et al. and 4,886,539 to Cerutti et al. is characterized by separate stages whereby more flexibility in controlling redox conditions is provided. The overall melting process disclosed in these patents consists of three stages: a liquefaction stage, a dissolving stage, and a vacuum refining stage. In the liquefaction stage, batch materials, preferably in a pulverulent state, are fed into a rotating, drum-shaped liquefying vessel. As batch material is exposed to the heat within the vessel, liquefied material flows down a sloped batch material lining to a central drain opening at the bottom of the vessel. A stream of liquefied material falls freely from the liquefaction vessel into a dissolving vessel for the dissolving stage. The dissolving vessel completes the dissolution of unmelted particles in the liquefied material coming from the liquefaction stage by providing residence time at a location isolated from the downstream refining stage. The dissolving vessel may be in the form of a horizontally elongated refractory basin with the inlet and outlet at opposite ends thereof so as to assure adequate residence time. The refining stage preferably consists of a vertically upright vessel that may be generally cylindrical in configuration having an interior ceramic refractory lining shrouded in a gas-tight, water-cooled casing. As the molten material enters the vessel from the dissolving vessel, it encounters a reduced pressure within the refining vessel. Gases included in the melt expand in volume, creating a foam. As foam collapses, it is incorporated into the liquid body held in the refining vessel. Refined molten material is drained from the bottom of the refining vessel into a receiving chamber and delivered to a float forming chamber.

A stirring arrangement may be employed in the multi-stage process to homogenize the glass after it has been refined in order to produce glass of the highest optical quality. If desired, a stirring arrangement may be integrated with a float forming chamber whereby the glass in the stirring chamber rests on a layer of molten metal. The molten metal may be continuous with the molten metal constituting the support in the forming chamber, and is usually comprised essentially of tin.

The multi-stage operation discussed above generally operates at a redox level of 0.30 or higher; however, redox levels below 0.30 may be achieved by increasing the amount of oxidizing constituents in the glass batch. For example, additional manganese oxide may be added to lower the redox level. Redox may also be controlled by adjusting the gas/$O_2$ ratio of the burners.

The transmittance data provided throughout this disclosure is based on a glass thickness of 0.160 inches (4.1 millimeters). Luminous transmittance (LTA) is measured using C.I.E. 1931 standard illuminant "A" over the wavelength range 380 to 780 nm at 10 nanometer intervals in accordance with ASTM 308E-90. Total solar ultraviolet transmittance (TSUV) is measured over the wavelength range 300 to 400 nm at 5 nanometer intervals. Total solar infrared transmittance (TSIR) is measured over the wavelength range 800 to 2100 nm at 50 nanometer intervals. Total solar energy transmittance (TSET) represents a computed value based on measured transmittances from 300 to 2100 nm at 50 nanometer intervals. All solar transmittance data is calculated using Parry Moon air mass 2.0 solar data. Glass color in terms of dominant wavelength and excitation purity are measured using C.I.E. 1931 standard illuminant "C" with a 2° observer.

To determine this transmittance data, the transmittance values are integrated over the wavelength range [a,b]. This range is divided into n equal subintervals of length h by points $\{X_0, X_1, \ldots, X_n\}$ where $X_i = a + (i \times h)$. An interpolating function is used to approximate the integrand $f$ in each subinterval. The sum of integrals of this function provides an approximation of the integral:

$$I = \int_a^b f(X) dX$$

In the case of calculations based on what is referred to as the Trapezoidal Rule which was used herein to calculate TSUV, TSIR and TSET, $f(X)$ is approximated on $[X_{i-1}, X_i]$ by a straight line passing through the graph of $f$ at these points. Thus, the interpolating function for $f(X)$ is piecewise linear on [a,b], and the numerical integration formula is:

$$I = \left[ f(X_0) + 2 \sum_{i=1}^{n-1} f(X_i) + f(X_n) \right] \times (h/2)$$

Table 1 illustrates examples of glass compositions at a 0.160 in. (4.1 mm) reference thickness which embody the principles of the present invention. Only the colorant portions of the examples are listed in the table below, with $Fe_2O_3$ being total iron, including that present as FeO.

The information provided in Table 1 is based on experimental laboratory melts. It is contemplated that the glass disclosed in the present invention preferably be made using a conventional, overhead fired continuous melting process, although either of the processes disclosed earlier may be used. It should also be noted that the analysis of these melts identified CoO and NiO levels of less than 3 PPM and $Cr_2O_3$ levels of no more than 9 PPM. In addition, there were $TiO_2$ levels of no more than 0.023 wt. %, which is believed to be from the cullet used in the melt. The low levels of these materials are considered to be tramp and/or residual material levels.

The representative base glass composition for the examples comprises:

| | |
|---|---|
| $SiO_2$ | 72.8% by weight |
| $Na_2O$ | 13.8 |
| CaO | 8.8 |
| MgO | 3.8 |
| $Al_2O_3$ | 0.13 |

It should be appreciated that this composition may vary especially as a result of the actual amount of colorant present in the glass composition.

D is the maximum transmittance, E is the percent transmittance at 750 nm, F is the average transmittance over the range from 400 nm to the wavelength corresponding to the maximum transmittance, and G is the average transmittance over the range from the wavelength corresponding to the maximum transmittance to 750 nm.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $Fe_2O_3$ wt. % | 0.455 | 0.463 | 0.464 | 0.466 | 0.466 | 0.503 | 0.527 | 0.583 | 0.584 | 0.594 |
| FeO wt. % | 0.096 | 0.119 | 0.104 | 0.115 | 0.120 | 0.128 | 0.142 | 0.142 | 0.160 | 0.146 |
| Redox | 0.211 | 0.257 | 0.224 | 0.247 | 0.258 | 0.254 | 0.269 | 0.244 | 0.274 | 0.246 |
| Se PPM | 10 | 5 | 6 | 7 | 8 | 6 | 5 | 5 | 4 | 4 |
| LTA (%) | 70.7 | 73.2 | 71.7 | 72.2 | 70.5 | 71.7 | 72.0 | 70.8 | 70.8 | 70.9 |
| TSIR (%) | 46.7 | 40.7 | 42.7 | 41.7 | 39.5 | 38.6 | 35.8 | 33.4 | 30.6 | 32.2 |
| TSUV (%) | 40.2 | 47.0 | 42.4 | 46.0 | 43.6 | 46.0 | 44.4 | 43.6 | 44.5 | 43.5 |
| TSET (%) | 56.9 | 55.4 | 55.4 | 55.3 | 53.3 | 53.8 | 52.3 | 50.2 | 48.9 | 49.7 |
| DW (nm) | 573.9 | 562.0 | 567.2 | 569.8 | 569.2 | 566.2 | 562.2 | 557.3 | 543.1 | 550.0 |
| Pe (%) | 8.21 | 3.53 | 5.18 | 5.19 | 5.63 | 4.37 | 3.88 | 3.35 | 2.27 | 2.70 |

Referring to Table 1, the present invention provides a bronze colored glass using a standard soda-lime-silica glass base composition and iron and selenium as colorants. Not all

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| A | 46.8 | 54.3 | 48.9 | 53.6 | 50.7 | 53.6 | 51.2 | 50.2 | 51.0 | 49.8 |
| B | 60.4 | 68.1 | 63.0 | 67.3 | 64.0 | 68.1 | 66.7 | 66.8 | 67.6 | 67.2 |
| C | 58.9 | 66.5 | 62.9 | 63.9 | 61.6 | 64.3 | 64.9 | 64.3 | 65.5 | 65.0 |
| D | 72.6 @ 590 nm | 75 @ 560 nm | 73.2 @ 560 nm | 73.9 @ 570 nm | 72.2 @ 570 nm | 73.5 @ 560 nm | 73.9 @ 560 nm | 73 @ 550 nm | 73.4 @ 540 nm | 73.4 @ 550 nm |
| E | 56.2 | 51.1 | 52.5 | 52.0 | 49.8 | 48.2 | 48.1 | 44.2 | 41.8 | 43.0 |
| F | 65.3 | 70.7 | 67.6 | 68.5 | 66.6 | 68.5 | 69.3 | 68.5 | 69.3 | 69.2 |
| G | 66 | 65.3 | 65.2 | 65.2 | 63.3 | 63.6 | 63.5 | 61.5 | 60.9 | 61 | of the examples are the same color as indicated by the dominant wavelengths (DW) and excitation purities (Pe). In the present invention, it is preferred that the glass be a bronze color characterized by dominant wavelengths in the range of 540 to 575 nm, with an excitation purity of up to 9%. The colorants used to produce a bronze colored glass with an LTA of 70% or greater include: 0.4 to 0.6 wt. % $Fe_2O_3$, 0.09 to 0.17 wt. % FeO and 3 to 11 PPM Se.

FIG. 1 illustrates the general shape of the transmittance curve of the glasses disclosed in Table 1 at individual wavelengths (hereinafter referred to as "monochromatic transmittance") within the visible spectrum. Table 2 provides monochromatic transmittance values at selected wavelength values at 4.1 mm thickness as follows: A is the percent transmittance at 380 nm, B is the percent transmittance at 400 nm, C is the percent transmittance at 440 nm, In one particular embodiment of the invention, the colorants of the glass include 0.45 to 0.53 wt. % $Fe_2O_3$, 0.1 to 0.15 wt. % FeO and 5 to 10 PPM Se. The TSET for these glasses range from about 52 to 57% and the dominant wavelength ranges from about 560 to 575 nm. In another embodiment of the invention, the colorants include 0.52 to 0.60 wt. % $Fe_2O_3$, 0.14 to 0.16 wt. % FeO and 3 to 6 PPM Se. These glasses exhibit a TSET ranging from about 48 to 53% and a dominant wavelength from about 540 to 565 nm. In comparing the glass compositions shown in Table 1, it should be appreciated that the higher performing glasses, i.e. those glasses having a lower TSET, generally have more total iron, more FeO and less selenium. In particular, the glasses having a total iron content of 0.50 wt. % and greater exhibited a TSET of generally about 55% or less, with the glasses having a total iron content of 0.58 to 0.60 wt. % having a TSET of generally about 50% or less.

From FIG. 1 and Table 2, it is seen that the monochromatic transmittance generally decreases from the shorter wavelengths to the longer wavelengths within the visible spectrum, which for the following discussion will be considered as the wavelength range of 400 to 750 nm. More particularly, within the visible spectrum, the average monochromatic transmittance in the shorter wavelength range of 400 nm to the glass's maximum transmittance, which ranges from about 65 to 71%, is generally higher than the average monochromatic transmittance in the longer wavelength range from the glass's maximum transmittance to 750 nm, which ranges from about 60 to 66%. The decrease in monochromatic transmittance generally ranges up to about 10%. Furthermore, the maximum monochromatic transmittance varies between approximately 72 to 75% at a wavelength of 540 to 590 nm and decreases to a monochromatic transmittance of about 41 to 56% at 750 nm, resulting in a transmittance reduction ranging of about 16 to 32%.

It is also believed that the bronze glass of the present invention may be produced using chromium, cobalt and/or nickel as additional colorants. In particular, in this alternate embodiment of the invention, the glass may include up to 50 PPM $Cr_2O_3$, up to 50 PPM NiO and up to 5 PPM CoO in addition to the iron and selenium discussed above.

The redox ratio for the glass of the present invention is maintained between about 0.20 to 0.30, and preferably between 0.24 to 0.28 which is the typical operating range for a conventional overhead fired melting operation. Higher redox levels may be attained by processes disclosed herein, but the use of higher redox ratios is preferably avoided to prevent excessive volatilization of selenium during melting.

Glass made by the float process typically ranges from a sheet thickness of about 1 millimeters to 10 millimeters. For the vehicle glazing applications, it is preferred that the glass sheets have a thickness within a range of 1.8 to 6 millimeters.

If desired, ultraviolet radiation absorbing materials may be added to the glass compositions of the present invention to improve its solar performance. Although not limiting in the present invention, a total of up to 2.0 wt. % of oxides of cerium, vanadium, titanium and molybdenum and combinations thereof may be used as UV absorbers to reduce the TSUV of the glass. In a preferred embodiment of the invention, $TiO_2$ is the preferred UV absorber and may be added in an amount ranging from 0.1 to 1.0 wt. % of the glass composition, and more preferably 0.2 to 0.5 wt. %.

In general, when the glass is used in a forward vision area of a vehicle, it is required that the LTA be 70% or greater. In addition, for a forward vision area application, it is preferred that the glass composition of the present invention provide a total solar energy transmittance of no greater than 60%, and more preferably no greater than 55%. This type of performance would make the glass comparable to or better than the performance of standard green automotive glasses.

Other variations as are known to those of skill in the art may be resorted to without departing from the scope of the invention as defined by the claims that follow.

We claim:

1. A bronze colored glass composition having a base glass portion comprising, in percent by weight:

| | |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 | and a colorant portion consisting essentially of:

| | |
|---|---|
| $Fe_2O_3$ (total iron) | about 0.4 to 0.6 percent by weight |
| FeO | about 0.09 to 0.17 percent by weight |
| Se | about 3 to 11 PPM | the glass having a luminous transmittance of about 70% or greater and a color characterized by a dominant wavelength in the range of about 540 to 567.2 nanometers at a thickness of 4.1 millimeters and a monochromatic transmittance which on the average decreases from the shorter wavelengths to the longer wavelengths in the visible spectrum.

2. The composition as in claim 1 wherein the $Fe_2O_3$ (total iron) concentration is from 0.45 to 0.53 wt. %, the FeO concentration is from 0.1 to 0.15 wt. % and the Se concentration is from 5 to 10 PPM.

3. The composition as in claim 1 wherein the $Fe_2O_3$ (total iron) concentration is from 0.52 to 0.6 wt. %, the FeO concentration is from 0.14 to 0.16 wt. % and the Se concentration is from 4 to 8 PPM.

4. The composition as in claim 1 further including additional ultraviolet absorbing material.

5. The composition as in claim 4 wherein said ultraviolet absorbing material is an oxide of a material selected from a group consisting essentially of cerium, vanadium, titanium and molybdenum and combination thereof in an amount up to 2.0 wt. % of the glass composition.

6. The composition as in claim 5 wherein said $TiO_2$ is in an amount from 0.1 to 1.0 wt. %.

7. The composition as in claim 6 wherein said $TiO_2$ is in an amount from 0.2 to 0.5 wt. %.

8. The composition as in claim 1 wherein the glass has an average monochromatic transmittance value within the visible spectrum over a first wavelength range below said wavelength corresponding to said maximum monochromatic transmittance, which is up to 10% greater than an average monochromatic transmittance value over a second wavelength range above said wavelength corresponding to said maximum monochromatic transmittance.

9. The composition as in claim 8 wherein said average monochromatic transmittance over said first range is between 65 and 71% and said average monochromatic transmittance over said second range is between 60 and 66 percent.

10. A glass sheet made from the composition as recited in claim 1.

11. The glass sheet as in claim 10 wherein the sheet has a thickness between 1.8 to 6 millimeters.

12. The glass sheet as in claim 10 wherein the glass has a total solar energy transmittance of no greater than 60%.

13. The glass sheet as in claim 12 wherein the $Fe_2O_3$ concentration is at least 0.5 wt. %, and the total solar energy transmittance is no greater than 55%.

14. The composition as in claim 1 wherein the glass color is characterized by a dominant wavelength in the range of about 540 to 565 nanometers.

15. A bronze colored glass composition having a base glass portion comprising, in percent by weight:

| | |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 | and a colorant portion consisting essentially of:

| | |
|---|---|
| $Fe_2O_3$ (total iron) | about 0.4 to 0.6 percent by weight |
| FeO | about 0.1 to 0.17 percent by weight |
| Se | about 3 to 11 PPM |
| CoO | 0 to about 5 PPM |
| NiO | 0 to about 50 PPM |
| $Cr_2O_3$ | 0 to about 50 PPM | wherein the glass has a luminous transmittance of about 70% or greater and the color of the glass is characterized by a dominant wavelength in the range of about 540 to 567.2 nanometers at a thickness of 4.1 millimeters.

16. The composition as in claim 15 wherein the color of the glass is characterized by a dominant wavelength in the range of about 540 to 565 nanometers at a thickness of 4.1 millimeters.

17. The composition as in claim 16 wherein the glass has a monochromatic transmittance which on the average decreases from the shorter wavelengths to the longer wavelengths in the visible spectrum.

18. The composition as in claim 16 wherein the glass has a total solar energy transmittance of no greater than 60% at a thickness of 4.1 millimeters.

19. The composition as in claim 18 further including additional ultraviolet absorbing material.

\* \* \* \* \*